United States Patent [19]

Furusawa et al.

[11] 4,310,176
[45] Jan. 12, 1982

[54] SEAT BELT LOCKING DEVICE FOR AN AUTOMOBILE VEHICLE

[75] Inventors: Takeshi Furusawa, Fujieda; Yoshimi Yamamoto, Shizuoka, both of Japan

[73] Assignee: Fuji Kiko Kabushiki Kaisha, Tokyo, Japan

[21] Appl. No.: 150,267

[22] Filed: May 15, 1980

[30] Foreign Application Priority Data

Aug. 31, 1979 [JP] Japan .................. 54-119949[U]

[51] Int. Cl.³ ........................................ B60R 21/10
[52] U.S. Cl. ................................ 280/801; 242/107.2; 297/474
[58] Field of Search .............. 280/801, 803, 806, 807; 297/474, 475, 476; 242/107.2, 107.3

[56] References Cited

U.S. PATENT DOCUMENTS

| 3,926,385 | 12/1975 | Board | 297/476 |
|---|---|---|---|
| 4,116,402 | 9/1978 | Nomura | 280/806 |
| 4,120,466 | 10/1978 | Adomeit | 280/806 |
| 4,136,422 | 1/1979 | Ivanov | 280/801 |
| 4,261,530 | 4/1981 | Asai | 280/806 |

FOREIGN PATENT DOCUMENTS

| 1755287 | 1/1972 | Fed. Rep. of Germany | 280/801 |
|---|---|---|---|
| 2308895 | 9/1974 | Fed. Rep. of Germany | 280/801 |
| 2324595 | 12/1974 | Fed. Rep. of Germany | 280/801 |
| 2452403 | 6/1976 | Fed. Rep. of Germany | 280/801 |

Primary Examiner—Joseph F. Peters, Jr.
Assistant Examiner—John A. Carroll
Attorney, Agent, or Firm—Thompson, Birch, Gauthier & Samuels

[57] ABSTRACT

A seat belt locking device used with a seat belt arrangement for an automobile vehicle. The locking device locks the seat belt for protecting the driver or passenger from danger when the vehicle is suddenly decelerated in an emergency case such as a collision. The seat belt locking device of the present invention comprises a slidable but unrotatable wedge-shaped seat belt locking member having a pair of roller supporting portions between which a roller is mounted, and a pair of fixed roller shafts the cross section of which is the segment of a circle. The seat belt is so arranged as to pass around the roller of the locking member and the two roller shafts, so that the belt can be firmly caught between the two flat portions of the wedge-shaped seat belt locking member and the respective flat portions of the roller shafts, when the vehicle is suddenly decelerated. The seat belt locking device thus improved can prevent the seat belt from being damaged, even if a strong belt locking force is often exerted, while incorporating a minimum number of necessary parts, without increasing the cost of the device.

8 Claims, 8 Drawing Figures

SEAT BELT LOCKING DEVICE FOR AN AUTOMOBILE VEHICLE

BACKGROUND OF THE INVENTION

1. Field of the Invention

The present invention relates generally to a seat belt arrangement for an automobile vehicle, and more particularly to the seat belt locking device used with a seat belt arrangement, in which a slidable but unrotatable wedge-shaped seat belt locking member having a rotatable roller and a pair of fixed flat-sided shaft member are provided for securely locking the seat belt between adjacent flat portions of these elements in an emergency.

2. Description of the Prior Art

The background of the present invention will be explained with respect to its application to the seat belt locking device used with a seat belt arrangement for an automobile vehicle.

As is well-known, there have been various safety-belt arrangements used for an automobile vehicle so as to protect a driver or passengers seated within the passenger compartment from danger caused by a shock when the vehicle is suddenly decelerated in such an emergency case as collision. Normally, the seat belt can be spooled out easily from a retractor by the driver or passenger and is pulled toward the retractor so that the seat belt may be brought into contact with the body of the driver under an appropriate tension. In the case where an automatic locking retractor is provided for the seat belt arrangement, the seat belt is locked or stopped from being further spooled out from the retractor in case an extraordinary shock is given to the arrangement. This is because an inertia sensitive sensor can detect the shock and lock the seat belt so that the seat belt can be prevented from being further spooled out from the retractor. However, it is usually difficult to stop the seat belt immediately after the inertia sensitive sensor detects a shock, because of so-called film spool effect. The film spool effect means here that the seat belt is further spooled out from the retractor because the belt is further wound more tightly around the spool after the sensor locks the seat belt. If the belt is further spooled out from the retractor because of the film spool effect in an emergency, such as a collision, the driver or passenger may suffer damage such as colliding with the steering wheel. In order to prevent this film spool effect, it is desirable to provide a seat belt locking device, in addition to an emergency locking retractor comprising a pawl and ratchet mechanism, for improvement in the reliability and responsiveness of the locking function of the seat belt arrangement.

Various seat belt locking devices have been used for this purpose. In these cases, three rollers or the like have conventionally been provided to lock the seat belt arranged to pass around the rollers. However, since the seat belt is caught by the rollers in a straight line, various problems have been encountered as follows:

(1) The seat belt is susceptible to damage.
(2) The seat belt locking force is not enough.
(3) The rollers are susceptible to breakage.
(4) The manufacturing and assembling of the parts is time consuming, and therefore costly.

Therefore, there has been a need for a seat belt locking device which can securely lock the belt without damaging the seat belt and also without increasing the cost of the device.

The prior-art seat belt locking devices will be described in detail after under DETAILED DESCRIPTION OF THE PRIOR ART.

SUMMARY OF THE INVENTION

With these problems in mind, therefore, it is the primary object of the present invention to provide a seat belt locking device for an automobile vehicle which can lock the seat belt securely so as to minimize the forward movement of the driver during a collision while preventing damage to the seat belt.

It is another object of the present invention to provide a seat belt locking device for use with an emergency locking retractor including a pawl-and-ratchet mechanism in order to prevent the film spool effect.

It is a further object of the present invention to provide a seat belt locking device which is strong and durable in structure without increasing the size or volume of the device.

It is a still further object of the present invention to provide a seat belt locking device which is economical in manufacture and assembly.

To achieve the above-mentioned objects, the seat belt locking device of the present invention comprises a slidable and unrotatable wedge-shaped locking member to which a roller is mounted, and a pair of fixed roller shafts the cross section of which is a major segment of a circle so that these three elements can lock the seat belt arranged to pass around these elements securely not under a line contact condition but under a surface contact condition, when the vehicle is suddenly decelerated.

The above and other related objects and features of the present invention will be apparent from the following description of the disclosure illustrated by the accompanying drawings and the novelty thereof pointed out in the appended claims.

BRIEF DESCRIPTION OF THE DRAWINGS

The features and advantages of a seat belt locking device according to the present invention over prior-art seat belt locking devices will be more clearly appreciated from the following description taken in conjunction with the accompanying drawings in which like reference numerals designate corresponding elements and in which.

DETAILED DESCRIPTION OF THE PRIOR ART

The background of the present invention will be particularly explained with respect to its application to the seat belt locking device.

Figure 1:
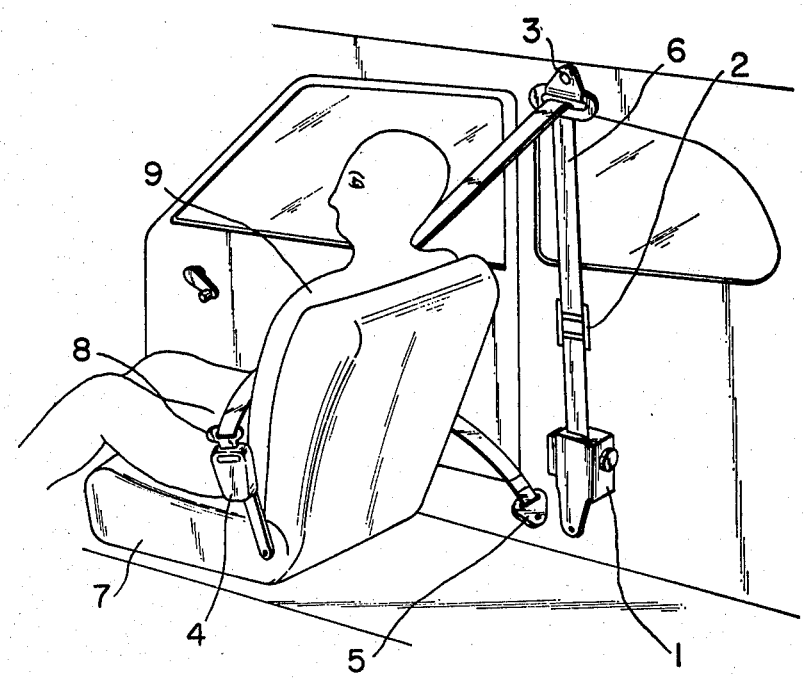
FIG. 1 is a pictorial view showing a conventional seat belt arrangement.

With reference to FIG. 1, a typical seat belt arrangement is composed of a retractor 1 having an emergency locking device 1a where a conventional pawl and ratchet are used, a seat belt locking device 2, a through ring 3, a buckle 4, a fixture 5, and a seat belt 6. The retractor to roll up the seat belt 6 is fixed to the lower part of a vehicle body behind the seat 7. The seat belt 6 rolled out from the retractor 1 is first passed through the through ring 3 fixed to the upper part of the automobile body behind the seat 7, passed through a tongue plate 8 movably fitted to the buckle 4 after obliquely passing across the breast of a driver 9, and lastly connected to the fixture 5 attached to the automobile body near the retractor 1 after horizontally passing back across the lap of the driver 9, as shown in FIG. 1. In this case, the seat belt is pulled toward the retractor 1 with a spring (not shown) installed therein so that an appropriate belt tension may be exerted against the driver 9. In the arrangement described above, the seat belt locking device 2 is fixed to the vehicle body somewhere between the retractor 1 and the through ring 3 in order to clamp the seat belt 6 in an emergency such as a collision; that is, in order to restrain the driver from being thrown frontward from the seat 7 in an emergency.

FIGS. 2, 3, 4 and 5 illustrate in detail the principle of the prior art seat belt locking device 2.

Figure 2:
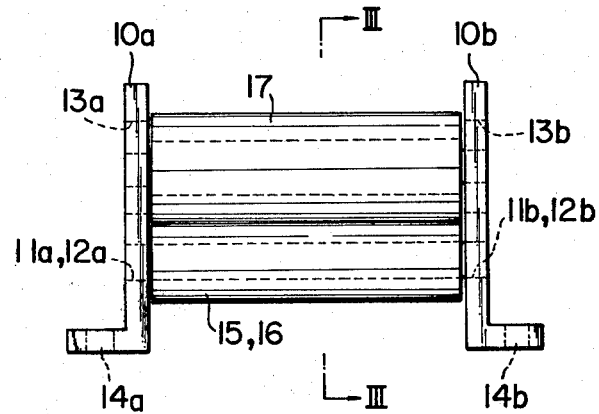
FIG. 2 is a side view showing a prior-art seat belt locking device.
Figure 3:
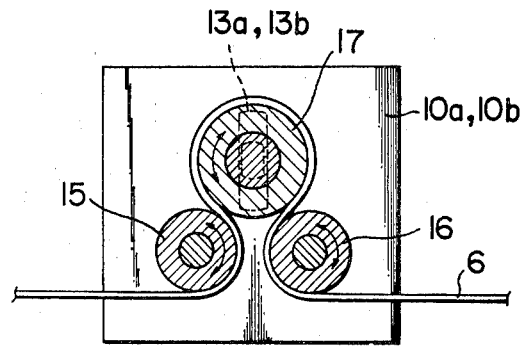
FIGS. 3, 4, and 5 are sectional views showing prior-art seat belt locking devices.

In FIGS. 2 and 3, numerals 10a and 10b designate L-shaped side plates, in which are formed two pair of roller supporting holes 11a, 12a, 11b, and 12b at the lower parts and a pair of slot-shaped roller supporting holes 13a and 13b at the upper part, respectively. In addition, at the bottom surfaces are formed a plurality of mounting holes 14a and 14b to fasten the seat belt locking device somewhere to the vehicle body. Rollers 15 and 16 are rotatably supported in two pair of the roller supporting holes 11a, 11b, and 12a, 12b. Central roller 17 is rotatably and also slidably supported in a pair of the slot-shaped roller supporting holes 13a and 13b.

Figure 4:
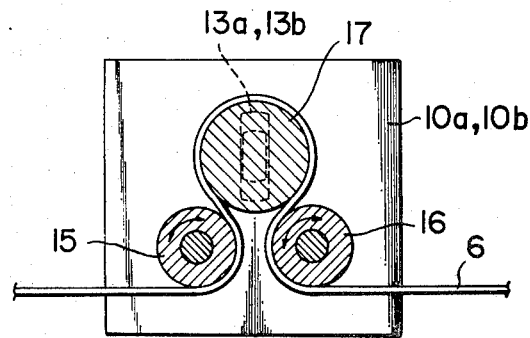

Also, in the case of the prior-art seat belt locking device shown in FIG. 4, the central roller 17 is so designed as to be slidable but not to be rotatable, because the roller 17 is retained by a slot-shaped shaft. Further, in the case of the prior-art seat belt locking device shown in FIG. 5, the central roller 17 is so designed as to be slidable, and not rotatable, in that it includes a pair of wedge-like flat portions.

Figure 5:
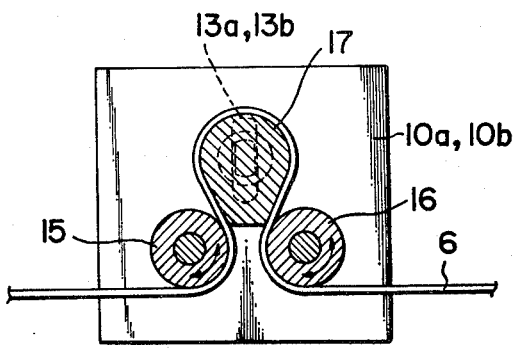

With the conventional seat belt locking devices 2 thus composed as shown in FIGS. 3, 4, and 5, the belt spooled out from the retractor 1 is arranged to pass around the central roller 17 and a pair of rollers 15 and 16. Accordingly, if a relatively great force is exerted to the belt 6 in an emergency such as collision, since the central roller 17 is pressure-pressed toward the two rollers 15 and 16 while sliding within the slot-shaped roller supporting holes 13a and 13b, the belt 6 is locked in between the rollers. In this case, it is usual that the central roller 17 is always biased away from rollers 15 and 16 with a spring (not shown) so as not to come into contact therewith.

However, conventional seat belt locking devices 2 as shown in FIGS. 3, 4, and 5 have several shortcomings. The basic problems are:

(1) Since the contacts between the rollers are in a straight line, the belt is susceptible to damage without serving the driver as a safety belt.

(2) Since a pair of rollers rotate, the locking force of the belt is not strong, and therefore the belt is susceptible to slippage without serving the function as a safety belt.

(3) Since the supporting shafts of the rollers 15 and 16 are relatively small in diameter, the strength of the shafts is not enough against a bending force exerted by the seat belt.

(4) Since the manufacture and assembly of the device is time consuming, it becomes comparatively costly.

DESCRIPTION OF THE PREFERRED EMBODIMENT

Figure 6:
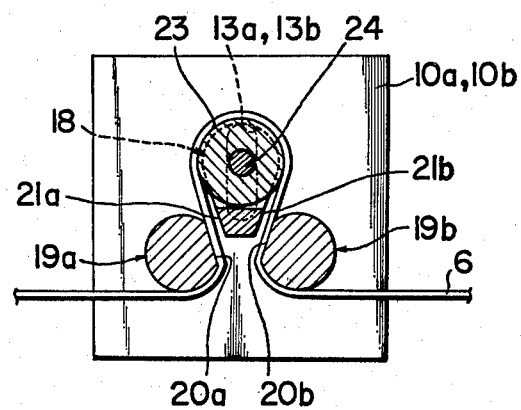
FIG. 6 is a sectional view showing a seat belt locking device embodying the present invention.
Figure 7:
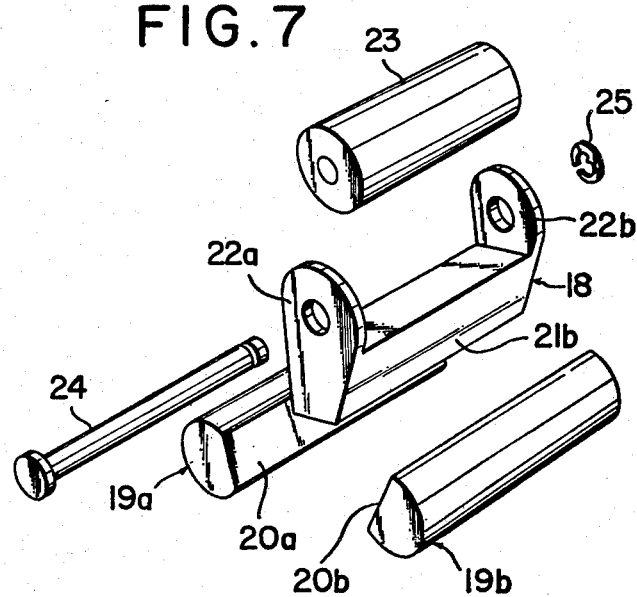
FIG. 7 is an exploded perspective view showing the main elements of a seat belt locking device embodying the present invention.

FIGS. 6 and 7 illustrate a preferred embodiment of the seat belt locking device of the present invention. The arrangement of the embodiment shown is basically the same as in the prior art devices. The seat belt 6 passes around a first stationary locking shaft member 19a, up around a roller 23 and down around a second stationary locking shaft member 19b. Each stationary locking shaft 19a and 19b is fixedly attached at respective ends thereof to side plates 10a and 10b defining a housing so as not to rotate as the belt 6 passes through the locking device. Each shaft member 19a and 19b is cylindrical in contour, but also includes a flat surface 20a and 20b, respectively, oriented axially thereon as shown in FIGS. 6 and 7, resulting in each shaft member having a cross section which is the major segment of a circle.

The roller 23 is rotatably mounted on a shaft 24 which is inserted into each side plate 10a and 10b and retained therein by an E-ring 25. A seat belt locking member 18 is pivotally attached to the shaft 24 and is adapted to pivot slightly about the shaft. The locking member 18 includes first and second roller supporting portions 22a and 22b integrally formed at respective ends thereof. The locking member also includes two flat askew portions 21a and 21b cooperating to define a wedge-shaped structure to function as described hereinbelow.

In the seat belt locking device of the present invention, the two flat askew portions 21a and 21b of the wedge-shaped locking member 18 are disposed facing respective flat portions 20a and 20b of the two locking shaft members 19a and 19b.

The roller mechanism comprising the roller 23, the locking member 18 and the shaft 24 is slidably mounted between the side plates 10a and 10b by inserting the shaft through an elongate slot 13a of the side plate 10a, the first roller support portion 22a, the roller 23, the second support portion 22b and, finally, through a second elongate slot 13b of the side plate 10b identical to the first slot 13a. The roller mechanism is slidably retained therein by attaching the E-ring 25 to the protruding end of the shaft 24.

The roller mechanism comprising the roller 23, the locking member 18 and the shaft 24 is retained toward the upper end of the elongate slots 13a and 13b, as shown in FIG. 6, by means urging the roller mechanism away from the locking shaft members 19a and 19b. In the preferred embodiment, this is accomplished by identical springs 29 positioned, preferably on the outer surfaces of respective side plates 10a and 10b, to engage the shaft 24 to urge the roller mechanism upwardly. With the roller mechanism so positioned, the safety belt 6 freely slides through the locking device of the present invention. However, if sufficient tension is applied to the belt 6 to overcome the force of the springs 29, the roller mechanism is forced, downward in FIG. 6, into the wedge formed by the locking shaft member flat surfaces 20a and 20b, resulting in the belt being wedged against either the locking shaft member surface 20a and locking member askew portion 21a, or corresponding surfaces 20b and 21b, depending on the initial direction of travel of the belt.

In the usual seat belt arrangement, an automatically-locking retractor is used as the retractor 1. The automatically-locking retractor is, for example, composed of an inertia sensor with a weight to which a ratchet pawl is fixed and a ratchet wheel to which a winding shaft is fixed. The operation theory of this retractor is described below referring to FIG. 8, although not directly related to this invention. The seat belt can freely be spooled out from a spool 26 against a winding force biased by a spring 27 under a normal condition, because the ratchet wheel is released from the pawl (both the parts are provided in a sensor unit 28). In this case, if an inertia is applied frontward to the sensor in an emergency case, the ratchet pawl attached to the inertia sensor locks the ratchet wheel to prevent the reel from being further rotated in the belt spooling-out direction.

If the rotation of the reel is stopped by the engagement of the ratchet pawl and the ratchet wheel in an emergency case, an extraordinary tension strength is exerted to the seat belt locking device 2. This tension strength applied to the belt 6 forces the locking member 18 downward against the action of springs 29 so as to bring the flat portions 21a and 21b of the member 18 toward the two flat portions 20a and 20b of the locking shaft members 19a and 19b, thereby pinching or wedging the belt to lock it therebetween against further movement. Upon releasing the tension applied to the belt, the springs 29 urge the locking member 18 upwardly away from the two stationary shaft members 19a and 19b to release the gripping force on the safety belt, thereby permitting free movement of the belt through the seat belt locking device.

Figure 8:
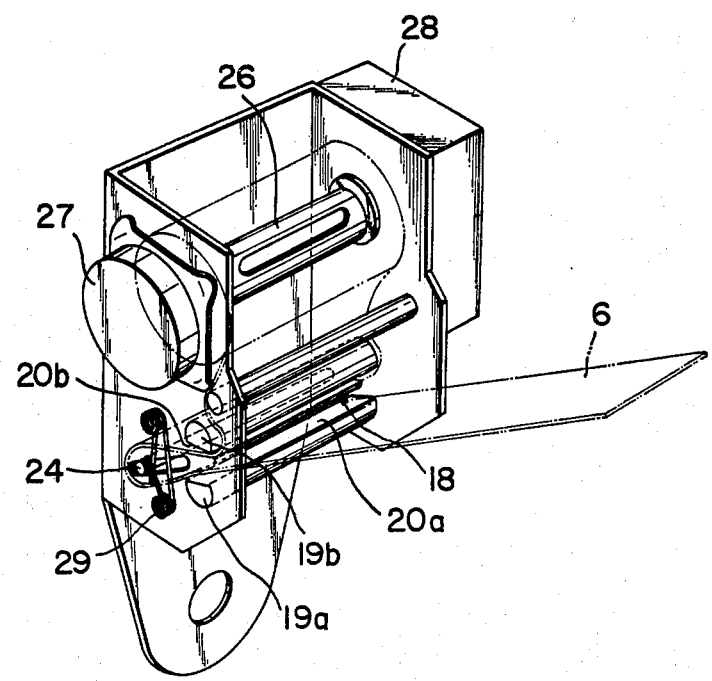
FIG. 8 is a perspective view showing a seat belt locking device of the present invention, which is assembled with an emergency locked-type retractor.

FIG. 8 shows the present embodiment assembled into the automatically locking retractor 1. The retractor 1 includes a spool 26 to wind up the seat belt 6, a winding spring 27 to automatically retract the seat belt 6, and a sensor unit 28, as explained hereinabove. So assembled into the automatically locking retractor 1, the seat belt locking device of the present invention functions in the same manner as when it is affixed to the body as shown in FIG. 1.

As may be readily appreciated by those skilled in the art, the seat belt locking device of the present invention results in, inter alia, the following improvements:

(1) Since the safety belt is compressed between the locking member and locking shaft members under a surface contact condition, the retaining force exerted thereby on the belt is greatly enhanced, while minimizing damage to the belt.

(2) Since the locking shaft members are not rotatable, larger shafts may be used, thereby strengthening the seat belt locking device.

(3) Using fewer parts reduces the cost of manufacture and assembly.

It will be understood by those skilled in the art that the foregoing description is in terms of preferred embodiments of the present invention wherein various changes and modifications may be made without departing from the spirit and scope of the invention, which is to be defined by the appended claims.

What is claimed is:

1. A seat belt locking device for an automobile vehicle comprising:

(a) a housing;

(b) a locking member having first and second askew surfaces defining a truncated wedge, mounted within said housing about a locking member shaft, said shaft being slidably mounted within said housing;

(c) a roller, rotatably positioned on said locking member shaft;

(d) first and second stationary shaft members, each having a lengthwise flat surface thereon, each of said shaft members being fixedly mounted within said housing equidistant from a line defined by the movement of said locking member shaft such that respective said stationary shaft member flat surfaces are positioned adjacent respective locking member askew surfaces; and (e) means for urging said locking member in a direction away from said stationary shaft members, whereby a safety belt passing into said device, between said first stationary shaft member flat surface and said first locking member askew surface, around said roller, between said second stationary shaft member flat surface and said second locking member askew surface, and out of said device, is caused to be gripped between respective stationary shaft member flat surfaces and locking member askew surfaces upon the application of sufficient tension to said safety belt to overcome the force exerted by said urging means to permit said locking member to be urged toward said respective stationary shaft member flat surfaces in response to the application of sufficient tension applied to said safety belt.

2. The device set forth in claim 1, wherein said urging means comprises a compression spring attached to said housing and engaging said locking member shaft to urge said locking member to urge said locking member in a direction away from said stationary shaft members.

3. The device set forth in claim 1, which is used together with an emergency locking device including a ratchet pawl and a ratchet wheel.

4. The device set forth in claim 3, which is assembled within said housing together with an emergency locking device including a ratchet pawl and a ratchet wheel.

5. A seat belt locking device for an automotive vehicle comprising:

(a) a housing provided with two slots on either side thereof;

(b) a locking member shaft slidably mounted in the slots provided in said housing;

(c) a roller rotatably positioned on said locking member shaft;

(d) a locking member having first and second askew surfaces defining a truncated wedge, said locking member being mounted within said housing about said locking member shaft, (e) first and second stationary shaft members each having a lengthwise flat surface thereon, each of said stationary shaft members being fixedly mounted within said housing equidistant from a line defined by the movement of said locking member shaft such that respective said stationary shaft member flat surfaces are positioned adjacent respective locking member askew surfaces; and (f) means for urging said locking member in a direction away from said stationary shaft members, whereby a safety belt passing into said device, between said first stationary shaft member flat surface and said first locking member askew surface, around said roller, between said second stationary shaft member flat surface and said second locking member askew surface, and out of said device, is gripped between respective stationary flat surfaces and locking member askew surfaces upon the application of sufficient tension to said safety belt to overcome the force exerted by said urging means permitting said locking member to be urged toward said respective stationary member flat surfaces in response to the application of sufficient tension applied to said safety belt.

6. The device set forth in claim 5, wherein said urging means comprises a compression spring attached to said housing and engaging said locking member shaft to urge said locking member in a direction away from said stationary shaft members.

7. The device set forth in claim 5, further having associated therewith an emergency locking device including a ratchet pawl and a ratchet wheel.

8. The device set forth in claim 7, wherein said emergency locking device is assembled within said locking device housing.

* * * * *